United States Patent [19]

Mazdiyasni

[11] 4,177,230

[45] Dec. 4, 1979

[54] PROCESS FOR PRODUCING REACTION SINTERED SILICON NITRIDE OF INCREASED DENSITY

[75] Inventor: Khodabakhsh S. Mazdiyasni, Xenia, Ohio

[73] Assignee: The United States of America as represented by the Secretary of the Air Force, Washington, D.C.

[21] Appl. No.: 911,746

[22] Filed: Jun. 2, 1978

[51] Int. Cl.$^2$ .................. C04B 35/56; C04B 35/58; C01B 21/06
[52] U.S. Cl. .................................. 264/60; 106/44; 106/73.5; 264/65; 264/66; 423/344; 423/406
[58] Field of Search .................. 423/344, 406; 106/44, 106/73.5; 264/60, 65, 66

[56] References Cited

U.S. PATENT DOCUMENTS 3,892,583   7/1975   Winter et al. .................. 106/44

FOREIGN PATENT DOCUMENTS 2236078   3/1974   Fed. Rep. of Germany ............ 106/44
1432559   4/1976   United Kingdom .................... 423/344

*Primary Examiner*—Jack Cooper
*Attorney, Agent, or Firm*—Joseph E. Rusz; Cedric H. Kuhn

[57] ABSTRACT

Porous reaction sintered silicon nitride body is infiltrated with an organosilicon compound after which the body is heated at a temperature sufficient to decompose the infiltrated material, resulting in a silicon nitride body having an increased density and significantly improved room temperature strength.

3 Claims, No Drawings

PROCESS FOR PRODUCING REACTION SINTERED SILICON NITRIDE OF INCREASED DENSITY

RIGHTS OF THE GOVERNMENT

The invention described herein may be manufactured and used by or for the Government of the United States for all governmental purposes without the payment of any royalty.

FIELD OF THE INVENTION

This invention relates to a process for increasing the density and improving the room temperature strength of silicon nitride bodies. In one aspect, it relates to reaction sintered silicon nitride bodies having an increased density and improved room temperature strength.

BACKGROUND OF THE INVENTION

Reaction sintered silicon nitride may be prepared in much purer form than the hot pressed material by using high purity silicon powders and nitrogen gas in a solid gas reaction at a relatively low temperature (1300°–1450° C.). Reaction sintered silicon nitride is perhaps the best candidate high temperature structural ceramic for applications requiring moderate strength. Furthermore, the low cost and ease of fabrication to near net shape combined with a low modulus of elasticity and coefficient of thermal expansion, critical parameters for good thermal shock resistance, make reaction sintered nitride a unique ceramic material for use in limited life gas turbine engines, rocket and laser nozzles, and radomes.

The foregoing favorable aspects combine to provide a strong impetus for its application as a high temperature structural ceramic. However, there are two major physical properties, namely, oxidation resistance and room temperature strength, that require improvement. Both of these properties are sensitive to surface and interconnected porosity in the as-nitrided material.

It is a principal object of this invention, therefore, to provide a process for filling or reducing the open pore volume in reaction sintered silicon nitride.

Another object of the invention is to provide a process for increasing the density and improving the room temperature strength of a reaction sintered silicon nitride body.

A further object of the invention is to provide a silicon nitride body infiltrated with a thermally decomposed organosilicon compound.

Other objects and advantages of the invention will become apparent to those skilled in the art upon consideration of the accompanying disclosure.

SUMMARY OF THE INVENTION

The present invention resides in a process for treating a porous reaction sintered silicon nitride body so as to increase its density and improve its room temperature strength. In accordance with one embodiment of the process, the silicon nitride body and an organosilicon compound are heated under a vacuum at a temperature and for a period of time sufficient to melt the organosilicon compound after which heating is continued at about the same temperature under an inert atmosphere for a period of time sufficient for the organosilicon compound to infiltrate or to be absorbed into the porous body. The infiltrated body is then heated under an inert atmosphere at a temperature and for a period of time sufficient to decompose the infiltrated material within the porous structure of the silicon nitride body. The silicon nitride body obtained has an increased density and improved room temperature strength as compared to the untreated body. Furthermore, as a result of the treatment, any silicon oxynitride that may be present is eliminated and the ratio of $\alpha$ to $\beta$ silicon nitride is increased.

As indicated above, in the initial step of the process, the reaction sintered silicon nitride body and the organosilicon compound are heated under a vacuum, e.g., $1\times10^{-2}$ to $1\times10^{-4}$ mm Hg. The temperature, which is sufficient to melt the organosilicon compound, is usually in the range of about 250° to 300° C. It is generally preferred to heat the vessel containing the silicon nitride and the organosilicon compound slowly to the indicated temperature, e.g., over a period of about 15 to 30 minutes. During this period the organosilicon compound melts and saturates the porous silicon nitride body. The vessel is then pressured to about 1 atmosphere with an inert gas and heating is continued at the aforementioned temperature for a period of about 4 to 6 hours. The heating is conducted in a nitrogen atmosphere when the organosilicon compound is silazane and in an argon atmosphere when the organosilicon is a polysilane. During this period the melted organosilicon compound infiltrates the porous silicon nitride body and is partially thermally decomposed within the porous structure. The infiltrated body is next removed from the vessel and heated under a blanket of an inert gas in a furnace whose temperature is raised to a temperature of about 1300° to 1400° C. over a period of about 5 to 7 hours. The body is held at this elevated temperature for about 0.5 to 2 hours after which it is allowed to cool to room temperature while still in an inert atmosphere. During heating at the elevated temperature, the organosilicon compound in the pores of the silicon nitride body is decomposed to silicon nitride or silicon carbide depending upon the organosilicon compound used. It is within the scope of the invention to repeat the foregoing procedure one or more times so as to further increase the density of the silicon nitride body. While the present process is described as being carried out in a reaction vessel and a furnace, it is within the contemplation of the invention to conduct the entire operation in an autoclave.

In another embodiment of the invention, the porous silicon nitride body is placed in a saturated solution of the organosilicon compound. Suitable solvents for the organosilicon compound include toluene, xylene and tetrahydrofuran. The saturated solution containing the silicon nitride body is then subjected to hydrostatic or isostatic pressure, thereby causing the solution to infiltrate the porous body. Solvent is then removed from the silicon nitride body by evaporation, leaving the organosilicon compound as a residue in the pores of the body. The silicon nitride body containing the organosilicon compound is then heated in the manner described above so as to decompose the compound to silicon nitride or silicon carbide depending upon the organosilicon compound used.

In the practice of the present invention, any organosilicon compound can be used that has the capability of decomposing under conditions of the process into silicon nitride or silicon carbide. Examples of such compounds that can be utilized include hexaphenylcyclotrisilazane (silazane) and polysilane. A process for preparing the silazane is described by E. Larsson et al in J. Amer. Chem. Soc. 75, 995–997(1953). The reaction involved in synthesizing the silazane can be represented by the following equation:

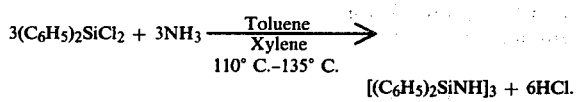

[(C$_6$H$_5$)$_2$SiNH]$_3$ + 6HCl.

The polysilane is prepared by adding phenylmethyldichlorosilane to dimethyldichlorosilane and reducing the mixture with Na/K (78%K). The reaction that occurs is shown by the following equation.

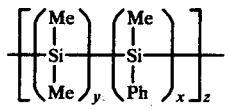

wherein the ratio of x to y varies from 1:4 to 1:20 z is an integer ranging from about 1 to 100, Me is methyl and Ph is phenyl. Depending upon the mole ratio of PhMeSiCl$_2$ to Me$_2$SiCl$_2$, which may vary from 1:4 to 1:20, polysilanes can be readily prepared with a wide range of melting points and decomposition temperatures.

A more complete understanding of the invention may be obtained by referring to the following illustrative examples which are not intended, however, to be unduly limitative of the invention.

EXAMPLE I

Preparation of Hexaphenylcyclotrisilazane

Diphenyldichlorosilane (46 g; 0.182 mole) was dissolved in dry toluene or dry xylene and reacted with excess ammonia for about 5 hours under reflux conditions (110° C. for toluene and 135° C. for xylene). The hot reaction mixture was filtered and the filtrate was chilled to give white crystals. After recrystallization from toluene or xylene, a product yield of 37 percent was obtained using toluene as the solvent while a product yield of 67 percent was obtained using xylene as the solvent.

EXAMPLE II

Preparation of Polysilane

A polysilane was prepared by adding phenylmethyldichlorosilane to dimethyldichlorosilane. The mole ratio of Me$_2$SiCl$_2$ to PhMeSiCl$_2$ was 7.7 to 1. The mixture was reduced with Na/K (78%K) alloy for 36 hours. The reaction mixture was chilled with hexane and with water to give a polymer in 96% yield. The polysilane was a semicrystalline gummy material, and the ratio of Me$_2$Si to PhMeSi groups forming the polymer was 5 to 1.

EXAMPLE III

The silazane and polysilane, prepared as described in the foregoing examples, were thermally decomposed in an inert atmosphere, nitrogen in the case of silazane and argon in the case of the polysilane. The decomposition was carried out at a temperature in the range of 900° to 1400° C. As determined by scanning electron microscopy, the decomposition of silazane produced very large, perfect, white whisker bundles of α-Si$_3$N$_4$ while greenish black whiskers of β-SiC were obtained by decomposing the polysilane. The Si$_3$N$_4$ whisker surfaces were smooth and highly regular (≃1.3 μm in diameter) with their ballpoint tip configurations, which are nucleating sites, containing very small amounts of iron. The SiC whiskers were mostly irregular and pin-shaped or in a form resembling rosary beads.

EXAMPLE IV

A series of runs was conducted in which porous reaction sintered silicon nitride bodies were treated in accordance with the process of this invention. Four grades of commercially available porous reaction sintered silicon nitride were cut into 2"×½"×⅛" bars which were diamond ground and polished. The bars were given a final finish by hand polishing with 15 μm diamond paste. The polished bars were ultrasonically cleaned for 1 hour in distilled water, 10 minutes in methanol and finally 10 minutes in dry acetone. Thereafter, the bars were dried at 110° C. under a vacuum for 24 hours. The bulk densities of the bars were measured and their tensile surfaces were optically inspected before and after treatment for any large flaws which might cause failure at an unrepresentative strength.

In each run three bars of one of the four grades of silicon nitride were placed in a glass vessel containing either silazane or polysilane prepared as described in Examples I and II. The glass vessel with ground glass joints was equipped with a condenser vented into a parrafin oil bubbler connected to a drying tower. The glass vessel containing silicon nitride bars and silazane or polysilane was initially evacuated to 1×10$^{-3}$ mm Hg and heated over a period of about 25 minutes to 250°–300° C. in order to melt the silicon nitride or silicon carbide precursors (silazane or polysilane) and allow them to saturate the silicon nitride bars. The infiltrated silicon nitride bars were removed from the glass vessel and fired in a furnace under nitrogen (silazane impregnated bars) or argon (polysilane impregnated bars) at a heating rate of 2° C./min to 600° C., 8° C./min from 600° C. to 1400° C. The bars were maintained at 1400° C. for 1 hour and furnace cooled to room temperature under a nitrogen or argon atmosphere.

EXAMPLE V

The as-received reaction sintered silicon nitrides and the infiltrated silicon nitride bars, prepared as described in Example IV, were subjected to X-ray diffraction studies. The X-ray diffraction patterns of the as-received materials were highly crystalline and revealed predominantly α-Si$_3$N$_4$ with minor amounts of β-Si$_3$N$_4$. Scans were made at 1°θ2 /min on powders of the as-received materials using CuK radiation. Silicon nitride materials from two of the sources contained traces of silicon oxynitride as minor second phase impurity. However, X-ray diffraction patterns of the same materials after infiltration were invariably free or substantially free of silicon oxynitride. Also, the ratios of the α:β phase were noticeably increased. The reason for the increase in the ratios of the α:β composition is not completely understood. However, the significant reduction in some cases and virtually complete reduction in others of a silicon oxynitride phase from the infiltrated specimens are believed to be due to the presence of highly active carbon or methane by-products which act as oxygen getters, thereby decomposing the silicon oxynitride.

The microstructure of as-received and infiltrated low density grades of the silicon nitride materials were studied. The scanning electron micrograph (SEM) of a fracture surface of a typical porous reaction sintered silicon nitride from one of the commercial sources showed a very high volume open and interconnected porosity ($\approx 50\%$) and a loosely bonded grain structure. Similarly, the microstructure of a reaction sintered silicon nitride from another of the sources (a radome material) consisted of highly irregular, with some closed but mostly open, pores and loosely bonded grains.

The SEM of a fractured surface of the reaction sintered silicon nitride radome material infiltrated with silazane as described in Example IV showed a microstructure clearly indicating that the structure was highly infiltrated. The SEM of a fractured surface of a silazane infiltrated bar of silicon nitride from another source showed a microstructure dramatically different from the as-received material. The microstructure of the infiltrated material contained small plate-like or short rods of $\alpha$-$Si_3H_4$ which are responsible for the improvement in the room temperature strength of the material.

The SEM of a fractured surface of a porous body as prepared in Example IV showed a typical large pore filled with either pin shaped or long rods, a characteristic feature of a thermally decomposed polysilane precursor compound to $\beta$-SiC.

The room temperature flexural strengths of the silazane and polysilane infiltrated materials, prepared as described in Example IV, were determined in a 4-point bending in an Instron testing machine using a crosshead rate of 0.005 in/min. The average flexural strength of 3 specimens from each of the commercial sources with their measured densities and other physical properties are listed below in Tables I and II.

TABLE I
PHYSICAL AND ROOM TEMPERATURE FLEXURAL STRENGTH OF SILAZANE INFILTRATED POROUS REACTION SINTERED $Si_3N_4$

|  | Run No. 1 | Run No. 2 | Run No. 3 | Run No. 4 |
|---|---|---|---|---|
| Density $\rho$ = G/Cm³ |  |  |  |  |
| Before | 2.40 | 2.20 | 2.32 | 1.67 |
| After | 2.55 | 2.40 | 2.44 | 2.06 |
| 4 Point Bend[1] |  |  |  |  |
| Flexural $\sigma_F$ |  |  |  |  |
| Before | 28800 | 17000 | 18600 | 9000 |
| After | 39000 | 23000 | 27000 | 156000 |
| % $\sigma_F$ Increase | 35 | 35 | 45 | 73 |
| Color |  |  |  |  |
| Before | Gray | Gray | Gray | Gray White |
| After | Dark Gray | Black | Black | Black |
| Phase, X-ray Diff. CuK$\alpha$ |  |  |  |  |
| Before | $\alpha + \beta$ (Minor) | $\alpha + \beta$ (Equal amts) trace $Si_2N_2O$ | $\alpha + \beta$ (Minor amts) trace $Si_2N_2O$ | $\alpha + \beta$ (Minor amts) trace $Si_2N_2O$ |
| After | $\alpha + \beta$ (Minor) | $\alpha + \beta$ (Minor) | $\alpha + \beta$ (Minor) | $\alpha + \beta$ (Minor) |

[1] $\sigma_F$ Fracture stress, psi.

TABLE II
PHYSICAL AND ROOM TEMPERATURE FLEXURAL STRENGTH OF POLYSILANE INFILTRATED POROUS REACTION SINTERED $Si_3N_4$

|  | Run No. 5 | Run No. 6 | Run No. 7 | Run No. 8 |
|---|---|---|---|---|
| Density $\rho$ = G/Cm³ |  |  |  |  |
| Before | 2.40 | 2.20 | 2.32 | 9.67 |
| After | 2.48 | 2.33 | 2.2 | 1.94 |
| 4 Point Bend[1] |  |  |  |  |
| Flexural $\sigma_F$ |  |  |  |  |
| Before | 29000 | 16800 | 18000 | 7800 |
| After | 35000 | 21000 | 20000 | 10500 |
| % $\sigma_F$ Increase | 21 | 26 | 11 | 35 |
| Color |  |  |  |  |
| Before | Gray | Gray | Gray | Gray White |
| After | Greenish Gray | Greenish Gray | Greenish Gray | Greenish Black |
| Phase, X-ray Diff. CuK$\alpha$ |  |  |  |  |
| Before | $\alpha + \beta$ (Minor) | $\alpha + \beta$ (Equal amts) trace $Si_2N_2O$ | $\alpha + \beta$ (Minor amts) trace $Si_2N_2O$ | $\alpha + \beta$ (Minor amts) trace $Si_2N_2O$ |
| After | $\alpha + \beta$ (Minor) | $\alpha + \beta$ (Minor) | $\alpha + \beta$ (Minor) | $\alpha + \beta$ (Minor) |

[1] $\sigma_F$ Fracture stress, psi.

From the foregoing, it is seen that treatment of reaction sintered silicon nitride in accordance with the present invention resulted in bodies having higher densities and greatly improved room temperature strength. The undesirable silicon oxynitride phase present in some as-received material was eliminated (or substantially reduced), and the ratio of $\alpha$ to $\beta$ phase $Si_3N_4$ was increased. The significant improvement in room temperature strength of reaction sintered silicon nitride bodies is an important advance that goes a long way toward overcoming a problem associated with conventional materials. The infiltrated reaction sintered silicon nitride may be used as parts, such as stators and blades in high performance gas turbine engines as well as laser and rocket nozzles and laser hardened radomes.

As will be evident to those skilled in the art modifications of the present invention can be made in view of the foregoing disclosure without departing from the spirit and scope of the invention.

I claim:

1. A process for treating a porous reaction sintered silicon nitride body containing a trace amount of silicon oxynitride so as to increase its density and improve its room temperature strength, said process comprising the steps of:

(a) heating the silicon nitride body and an organosilicon compound under a vacuum to a temperature in the range of about 250° to 300° C. over a period of about 15 to 30 minutes, said organosilicon compound being a silazane having the following formula:

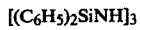

or a polysilane having the following formula:

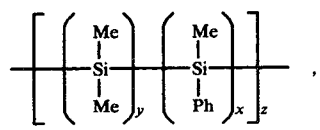

wherein the ratio of x to y ranges from 1:4 to 1:20, z ranges from about 1 to 100, Me is methyl, and Ph is phenyl;

(b) continuing the heating at a temperature in the range of about 250° to 300° C. for a period of about 4 to 6 hours, the heating being conducted in a nitrogen atmosphere when the organosilicon compound is silazane and in an argon atmosphere when the organosilicon compound is a polysilane;

(c) heating the resulting silicon nitride body infiltrated with the organosilicon compound to a temperature of about 1300° to 1400° C. over a period of 5 to 7 hours, the heating being conducted in a nitrogen atmosphere when the organosilicon compound is silazane and in an argon atmosphere when the organosilicon compound is a polysilane;

(d) continuing the heating at the temperature in the range of about 1300° to 1400° C. for about 0.5 to 2 hours, the organosilicon compound being thereby decomposed in pores of the silicon nitride body to $\alpha$-$Si_3N_4$ when the compound is the silazane and to $\beta$-SiC when the compound is the polysilane; and (e) allowing the infiltrated silicon nitride body substantially free of silicon oxynitride to cool to room temperature.

2. The process according to claim 1 in which the organosilicon compound is a silazane having the following formula:

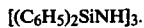

3. The process according to claim 1 in which the organosilicon compound is a polysilane having the following formula:

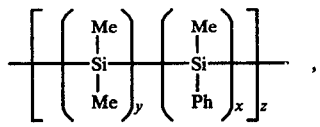

wherein the ratio of x to y ranges from 1:4 to 1:20, z ranges from 1 to 100, Me is methyl, and Ph is phenyl.

* * * * *